(12) United States Patent
Lehmann et al.

(10) Patent No.: US 7,093,902 B2
(45) Date of Patent: Aug. 22, 2006

(54) ADJUSTER FOR A VEHICLE SEAT

(75) Inventors: Ulrich Lehmann, Alfter-Bonn (DE); Uwe Assmann, Remscheid (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 31 days.

(21) Appl. No.: 10/860,092

(22) Filed: Jun. 3, 2004

(65) Prior Publication Data
US 2005/0017562 A1 Jan. 27, 2005

Related U.S. Application Data

(63) Continuation of application No. PCT/EP03/10143, filed on Sep. 12, 2003.

(30) Foreign Application Priority Data
Sep. 17, 2002 (DE) ................. 102 42 950

(51) Int. Cl.
*B60N 2/02* (2006.01)
(52) U.S. Cl. .................... 297/374; 297/361.1
(58) Field of Classification Search ............. 297/374, 297/361.1, 362
See application file for complete search history.

(56) References Cited

U.S. PATENT DOCUMENTS

| 5,090,771 | A | * | 2/1992 | Kawakita | ............... | 297/362 |
|---|---|---|---|---|---|---|
| 5,224,759 | A | | 7/1993 | Matsuura et al. | | |
| 5,265,936 | A | * | 11/1993 | Droulon et al. | .......... | 297/361.1 |
| 6,338,532 | B1 | | 1/2002 | Sugimoto | | |
| 6,454,354 | B1 | | 9/2002 | Vossmann et al. | | |
| 2003/0116689 | A1 | | 6/2003 | Schuler et al. | | |

FOREIGN PATENT DOCUMENTS

| EP | 0 415 781 A2 | 6/1991 |
|---|---|---|
| EP | 2 356 803 A | 6/2001 |
| WO | WO 00/44582 A1 | 8/2000 |
| WO | WO 02/34565 A1 | 5/2002 |

* cited by examiner

*Primary Examiner*—Milton Nelson, Jr.
(74) *Attorney, Agent, or Firm*—Womble Carlyle Sandridge & Rice PLLC

(57) ABSTRACT

In an adjuster (1) for a vehicle seat, in particular a backrest inclination adjuster for an automobile seat, having at least one detent fitting (5) with two fitting parts (7, 8) that can be pivoted relatively to one another around a central axis (13) and can be locked together, and a lever (6) which is mounted for pivoting around a pivoting axis (A), the pivoting of the lever (6) allowing to unlock the detent fitting (5), said detent fitting (5) can be unlocked via a rotatable driver (11) which is arranged around the central axis (13) and is accessible from the outside of the detent fitting (5), the lever (6) being in direct contact with the driver (11).

23 Claims, 3 Drawing Sheets

ADJUSTER FOR A VEHICLE SEAT

CROSS-REFERENCE TO RELATED APPLICATION

This is a continuation of PCT/EP03/10143, which was filed Sep. 12, 2003, designates the U.S., and is incorporated herein by reference.

BACKGROUND OF THE INVENTION

The present invention pertains to an adjuster for a vehicle seat, in particular a backrest inclination adjuster for an automobile seat, having at least one detent fitting with two fitting parts that can be pivoted relative to one another around a central axis and can be locked together, and a lever which is mounted for pivoting around a pivoting axis, with the pivoting of the lever causing the detent fitting to unlock.

An adjuster of the type described in the immediately preceding paragraph is known, for example, from WO 00/44582 A1. For the adjuster of WO 00/44582 A1, the lever is mounted on a central shaft, and the detent fittings on both sides of the vehicle seat can be unlocked simultaneously by turning the shaft.

BRIEF SUMMARY OF SOME ASPECTS OF THE INVENTION

The present invention is based on the object of improving an adjuster of the type mentioned in the two immediately preceding paragraphs. According to one aspect of the present invention, an adjuster for a vehicle seat, in particular a backrest inclination adjuster for an automobile seat, has at least one detent fitting with two fitting parts that can be pivoted relative to one another around a central axis and can be locked together, and a lever which is mounted for pivoting around a pivoting axis, with the pivoting of the lever causing the detent fitting to unlock, characterized in that the detent fitting can be unlocked via a rotatable driver which is arranged around the central axis and is accessible from the outside of the detent fitting, with the lever being in direct contact with the driver.

Because the detent fitting can be unlocked via a rotatable driver which is arranged around the central axis and is accessible from the outside of the detent fitting, with the lever being in direct contact with the driver, a modular system is created with which, using the same driver, a centrally borne lever or an uncentrally borne lever can be arranged on the outside of the detent fitting.

A drive engagement between the driver and the lever causes a defined unlocking movement; the drive engagement, particularly if the lever is centrally borne, can occur via an involute gear to achieve maximum momentum transmission. Higher moments can be transmitted by using a central arrangement. By using an uncentral arrangement of the pivoting axis of the lever, one can, on the one hand, reverse the sense of direction when unlocking the fitting, this feature providing better protection from load, and, on the other hand, select a suitable transmission ratio, a feature which increases operating comfort.

The invention can also be used for an adjuster with gear fittings in which a step-by-step switch is mounted on one gear fitting, the step-by-step switch being activated by the driver which, in turn, is moved by the lever.

BRIEF DESCRIPTION OF THE DRAWINGS

The invention is explained in greater detail below with reference to three exemplary embodiments which are shown in the drawings, in which.

DETAILED DESCRIPTION OF THE INVENTION

Figure 1:
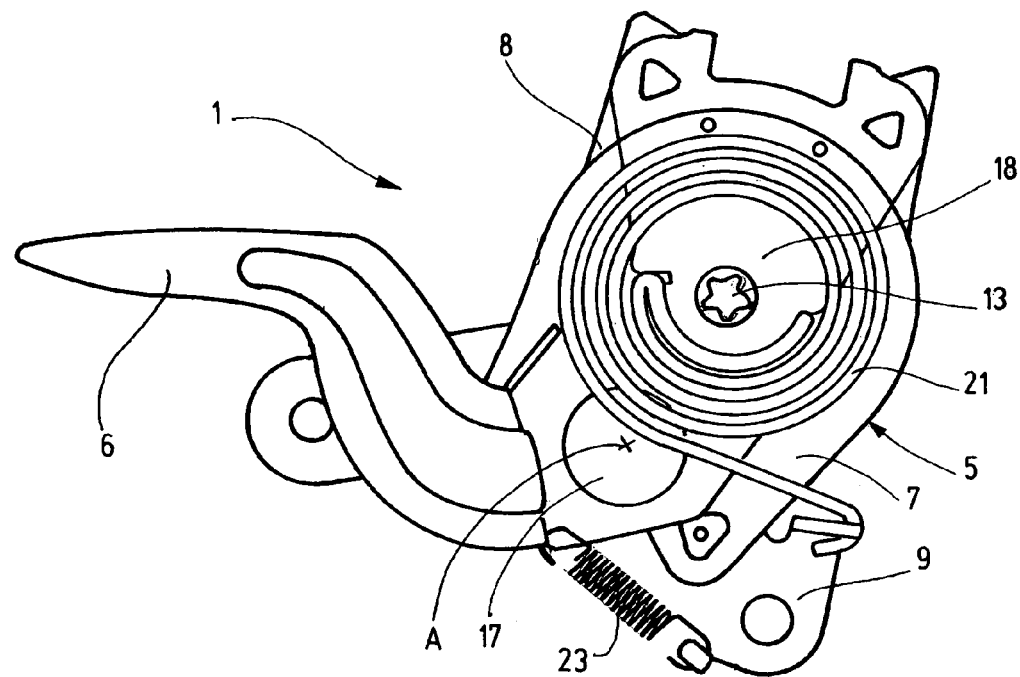
FIG. 1 is a side view of the first exemplary embodiment.
Figure 2:
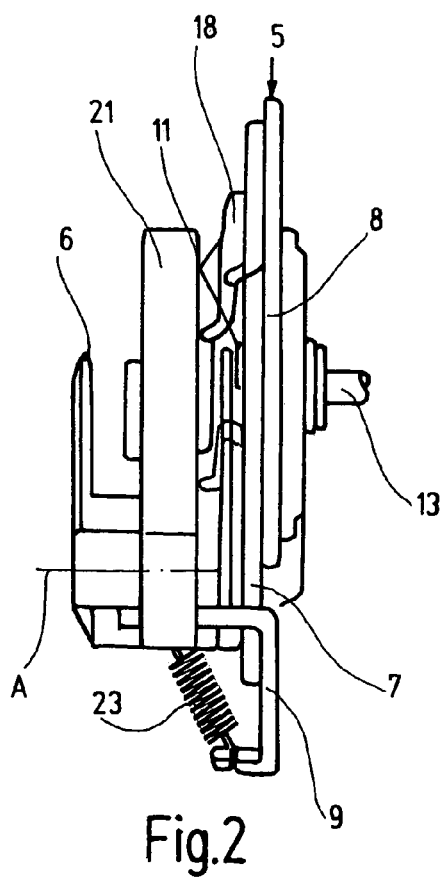
FIG. 2 is another side view of the first exemplary embodiment, shown rotated by 90° as compared to FIG. 1.
Figure 3:
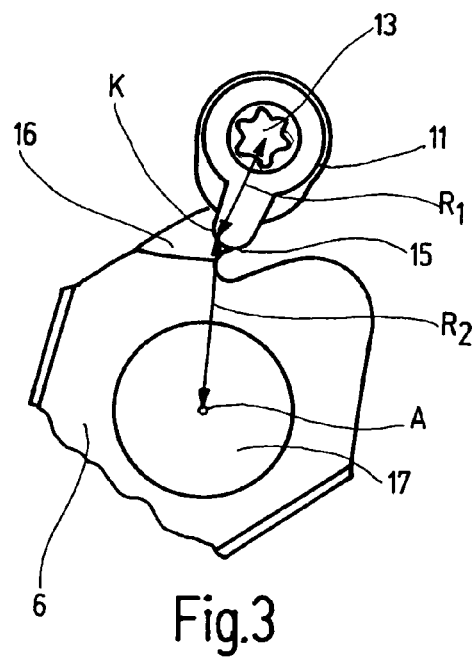
FIG. 3 is a detail view of FIG. 1 of a portion of the first exemplary embodiment, without the backrest compensation spring.
Figure 4:
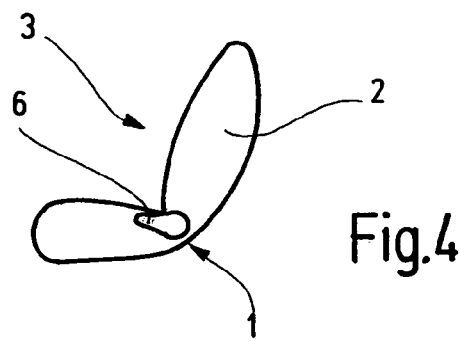
FIG. 4 is a schematic representation of a vehicle seat.
Figure 5:
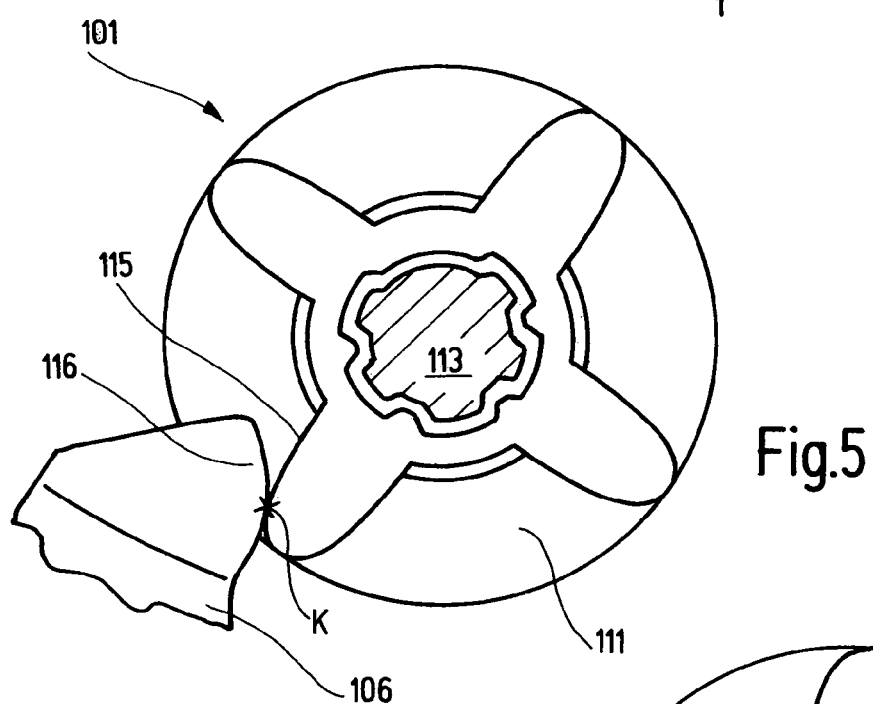
FIG. 5 is a detail view of the second exemplary embodiment in its initial position.
Figure 6:
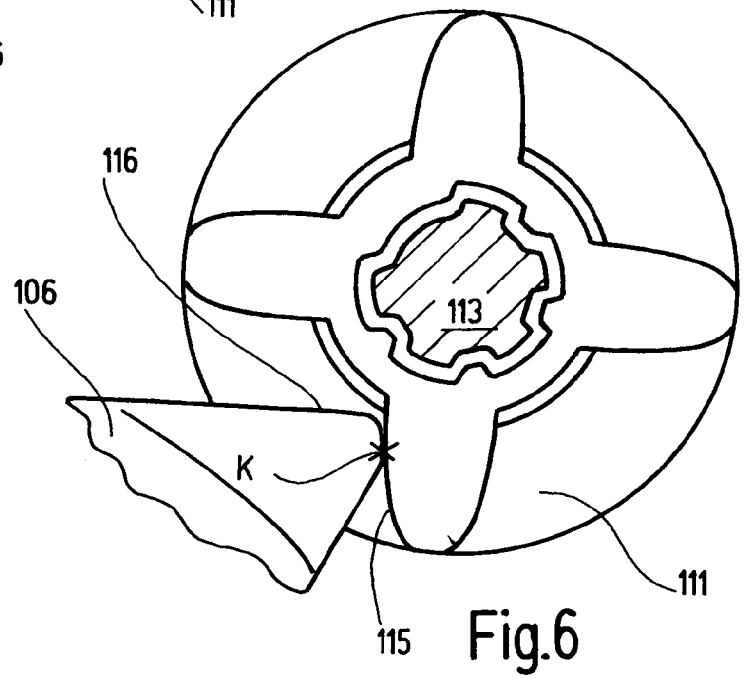
FIG. 6 is a detail view of the second exemplary embodiment in its final position.
Figure 7:
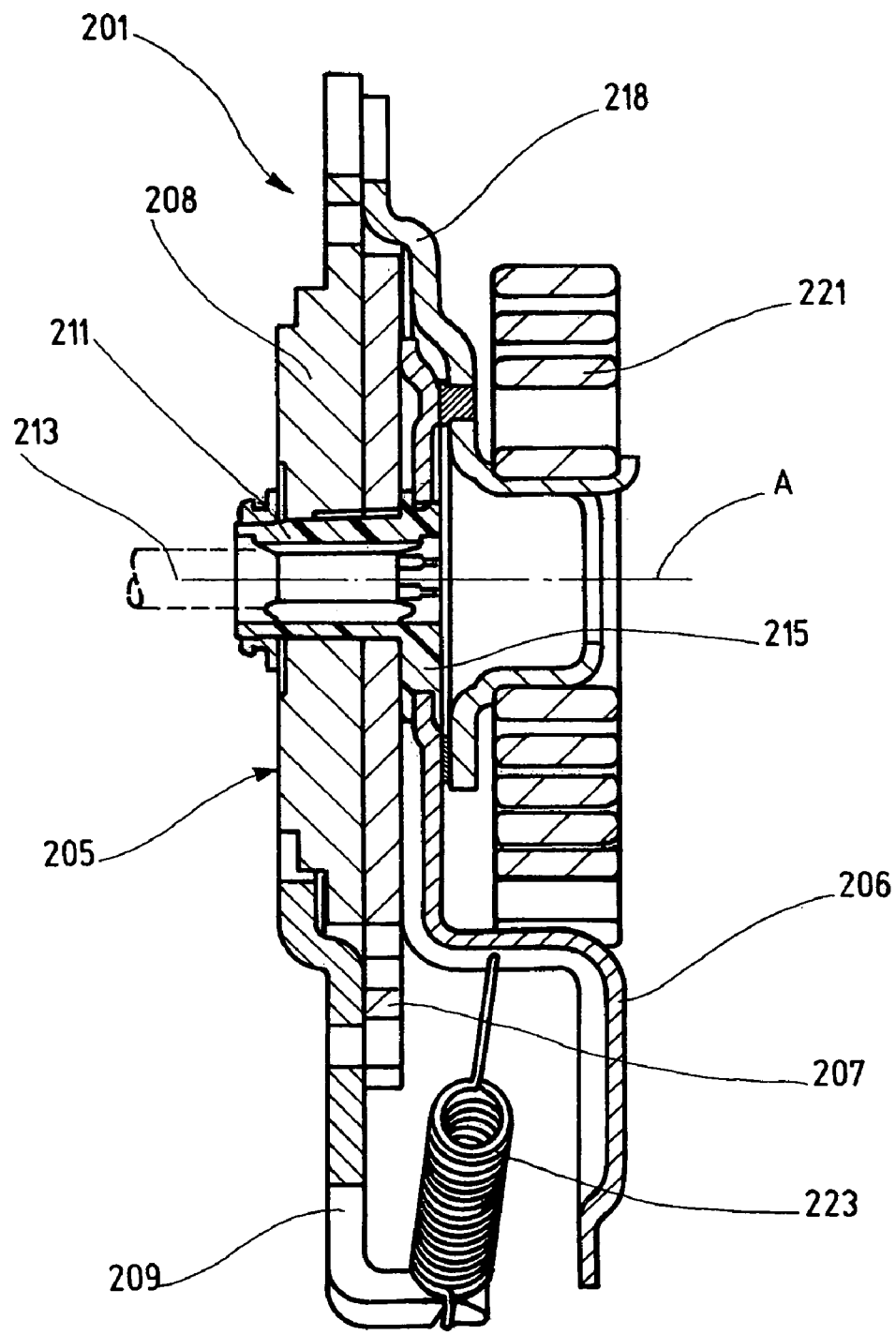
FIG. 7 is a cross-section through the third exemplary embodiment.

In the first exemplary embodiment, there is an adjuster 1 for adjusting the inclination of the backrest 2 of a vehicle seat 3, particularly an automobile seat, with the optional feature in two-door automobiles of free-swinging the backrest 2. The adjuster 1 has one detent fitting 5 on each side of the vehicle seat 3 and, on one side, a lever 6 for activating the adjuster 1.

Each of the two detent fittings 5 has a lower fitting part 7 and an upper fitting part 8 which can be rotated and locked relative to the lower fitting part 7. The lower fitting part 7 is fixed to the seat part structure of the vehicle seat 3 by means of a lower adapter 9, whereas the upper fitting part 8 is fixed to the structure of the backrest 2. Both fitting parts 7 and 8 enclose a construction space inside of which two latches can be radially slid. These two latches are borne and run in the lower fitting part 7, and these two latches cooperate with the upper fitting part 8 for locking. The latches are radially moved outward by means of a spring-loaded eccentric that is rotationally fixed on a centrally arranged driver 11, and are radially drawn inward by means of a catch disk that is arranged the same way. The structure of the detent fittings 5 is analogous to that in U.S. Pat. No. 6,454,354, which is incorporated herein by reference.

The two detent fittings 5 are both connected to the same driver by way of a profile shaft 13 which is rotationally fixed through a central receptacle of the drivers 11. The shaft 13 defines the central axis of the detent fittings 5. On that side of the adjuster 1 which is assigned to the lever 6, a first involute gear 15 is formed onto the driver 11, i.e. in the present case one single tooth, the lever 6 having a second involute gear 16, also in the form of a single tooth. The lever 6 is pivotably borne on the lower fitting part 7 by means of a bearing component 17, its pivoting axis A being arranged at a distance from the shaft 13, and parallel to it, i.e. being arranged uncentrally. The two involute gears 15 and 16 touch at contact point K which is the distance $R_1$ from the central axis of the shaft 13 and a distance $R_2$ from the pivoting axis A of the lever 6. During construction it is possible, by pre-selecting these distances for the initial position, to set an initial default transmission ratio for torque transmission between the lever 6 and the driver 11.

In addition, a retaining bracket 18 is attached to the upper fitting part 8, the retaining bracket supporting the inner end of a spirally coiled backrest compensation spring 21. The outer end of the pre-loaded backrest compensation spring 21 is attached to the lower adapter 9. The compensation spring 21 is designed to compensate, at least partially, for the weight of the backrest 2 when the inclination is being set and during free-swinging of the backrest. A pull spring 23 is attached between the lever 6 and the lower adapter 9, for pulling the lever 6 into its initial position against a stop in the lower adapter 9.

In order to activate the adjuster 1, i.e. particularly to unlock the detent fittings 5, the lever 6 is pulled upward, i.e. clock-wise with reference to FIG. 1. The second involute gear 16 then moves, with the contact point K changing its position, along the first involute gear 15, in which process torque is transmitted and, depending on the shape of the teeth, the transmission ratio is changed. This way, the driver 11 turns in the inverse sense, i.e. counter clock-wise in FIG. 1. This rotation movement is transmitted to the driver 11 of the other detent fitting 5 via the shaft 13. The driver 11 takes along the eccentric releasing the latches and the catch disk pulling the latches radially inward which are located inside the detent fitting 5. The detent fitting 5 is thus unlocked, so that the upper fitting part 8 and, thereby, the backrest 2 can be pivoted into the desired position.

The second exemplary embodiment of an adjuster 101 is similar to the first exemplary embodiment, so that like components and components having like functions are given reference signs increased by 100. The only difference is in the driver 111 being in the shape of the involute gear 115 which has four teeth each staggered at a 90° angle difference from one another. One of these teeth cooperates with the second involute gear 116 of the lever 106. The contact point K between the two curves migrates during the transition from the initial position to the end position. While rolling along the curves, the driver 111 and, thereby, the shaft 113 are rotated as before.

The third exemplary embodiment is in many points identical to the two other exemplary embodiments; for this reason, like components or components having like functions have reference signs increased by 200 or by 100, respectively. For example, the adjuster 1 has again a detent fitting 205 with an identical lower fitting part 207, upper fitting part 208 and driver 211 for the shaft 213 which is only schematically represented. The inner end of a spiral-shaped backrest compensation spring 221 is supported by the upper fitting part-fixed retaining bracket 218, the outer end of the spring being attached to a lower adapter 209 fixed to the lower fitting part.

The lever 206, however, which is again pre-loaded towards the lower adapter 209 by means of a pull spring 223, is not at a distance from the shaft 213. Rather, the lever 206 is centrally borne, i.e. its pivoting axis A is aligned with the shaft 213. For this purpose, the lever 206 has a receptacle positively receiving the driver 211 with its involute gear 215, so that the lever 206 is rotationally fixed to the driver 211. The involute gear 215 may have one tooth, as in the first exemplary embodiment, or several teeth, as in the second exemplary embodiment, the latter version allowing the transmission of higher moments. The rotational sense of the lever 206 and the driver 211 in this type of drive engagement are, of course, identical.

Because the same driver can be used both for the uncentrally and the centrally borne lever, a modular system is provided. This modular system will again be preferably complemented in that the bearing component 17 according to the two first exemplary embodiments will be formed similar to the driver on the side facing the lever. This way, not only the same driver, but also the same lever, can be used for both types of bearing.

That which is claimed:

1. An adjuster for a vehicle seat, the adjuster comprising:
   at least one detent fitting including two fitting parts that can be pivoted relative to one another around a central axis while the detent fitting is in an unlocked configuration, wherein the two fitting parts are locked together while the detent fitting is in a locked configuration; and
   a lever mounted for pivoting around a pivot axis,
   wherein the detent fitting is unlocked by way of a rotatable driver that is mounted so that rotation of the rotatable driver can cause the detent fitting to transition from the locked configuration to the unlocked configuration, the rotatable driver extends around the central axis and is accessible from outside of the detent fitting, and the lever is in direct contact with the rotatable driver so that pivoting of the lever causes rotation of the rotatable driver and thereby the transition of the detent fitting from the locked configuration to the unlocked configuration, and
   wherein the contact between the lever and the rotatable driver occurs via at least one gear.

2. The adjuster according to claim 1, wherein at least one of the lever and the driver are operative so that:
   the pivoting axis of the lever can be aligned with the central axis, or
   the pivoting axis of the lever can be arranged at a distance from the central axis.

3. The adjuster according to claim 1, wherein the adjuster is in combination with the vehicle seat, the vehicle seat includes a backrest, and the adjuster is for adjusting the backrest's inclination.

4. The adjuster according to claim 1, wherein the contact between the lever and the driver is outside of the detent fitting.

5. The adjuster according to claim 1, wherein the pivoting axis of the lever is aligned with the central axis.

6. The adjuster according to claim 5, wherein the lever is rotationally fixed on the driver.

7. The adjuster according to claim 1, wherein the pivoting axis of the lever is arranged at a distance from the central axis.

8. The adjuster according to claim 7, wherein:
   the gear is a first involute gear having at least one tooth;
   the contact between the lever and the driver occurs via contact between the first involute gear and a second involute gear having at least one tooth;
   the lever includes the first involute gear; and
   the driver includes the second involute gear.

9. The adjuster according to claim 1, wherein:
   the detent fitting further includes an eccentric mounted for rotating around the central axis to cause the detent fitting to transition from the unlocked configuration to the locked configuration, and
   the eccentric is fixedly mounted to the rotatable driver for rotating therewith.

10. The adjuster according to claim 9, wherein:
    the gear is a first involute gear having at least one tooth;
    the contact between the lever and the driver occurs via contact between the first involute gear and a second involute gear having at least one tooth;
    the lever includes the first involute gear; and
    the driver includes the second involute gear.

11. The adjuster according to claim 1, wherein the at least one detent fitting is a first detent fitting and the adjuster further comprises a second detent fitting and a shaft mechanically linking the first detent fitting and the second detent fitting to one another so that the first detent fitting and the second detent fitting operate synchronously.

12. The adjuster according to claim 11, wherein the rotatable driver is rotationally fixed to the shaft.

13. The adjuster according to claim 12, wherein the pivoting axis of the lever is aligned with the central axis.

14. The adjuster according to claim 13, wherein the lever is rotationally fixed on the driver.

15. The adjuster according to claim 12, wherein the pivoting axis of the lever is arranged at a distance from the central axis.

16. The adjuster according to claim 11, wherein the pivoting axis of the lever is aligned with the central axis.

17. The adjuster according to claim 16, wherein the lever is rotationally fixed on the driver.

18. The adjuster according to claim 11, wherein the pivoting axis of the lever is arranged at a distance from the central axis.

19. The adjuster according to claim 18, wherein:
the gear is a first involute gear having at least one tooth;
the contact between the lever and the driver occurs via contact between the first involute gear and a second involute gear having at least one tooth;
the lever includes the first involute gear; and
the driver includes the second involute gear.

20. An adjuster for a vehicle seat, the adjuster comprising:
at least one detent fitting including two fitting parts that can be pivoted relative to one another around a central axis while the detent fitting is in an unlocked configuration, with the detent fitting further including an eccentric mounted for rotating around the central axis to cause the detent fitting to transition from the unlocked configuration to a locked configuration, and the two fitting parts are locked together while the detent fitting is in the locked configuration; and
a lever mounted for pivoting around a pivot axis,
wherein the detent fitting is unlocked by way of a rotatable driver that is mounted so that rotation of the rotatable driver can cause the eccentric to rotate in a manner which causes the detent fitting to transition from the locked configuration to the unlocked configuration, and wherein the rotatable driver extends around the central axis and is accessible from outside of the detent fitting, and the lever is in direct contact with the rotatable driver so that pivoting of the lever can cause the rotation of the rotatable driver and thereby the transition of the detent fitting from the locked configuration to the unlocked configuration.

21. The adjuster according to claim 20, wherein the contact between the lever and the driver is outside of the detent fitting.

22. The adjuster according to claim 20, wherein:
the eccentric is fixedly mounted to the rotatable driver for rotating therewith;
the two fitting parts enclose a construction space; and
the detent fitting further includes two latches that are within the construction space and are moved radially outward by the eccentric to cause the detent fitting to transition from the unlocked configuration to a locked configuration.

23. The adjuster according to claim 20, wherein the at least one detent fitting is a first detent fitting and the adjuster further comprises a second detent fitting and a shaft mechanically linking the first detent fitting and the second detent fitting to one another so that the first detent fitting and the second detent fitting operate synchronously, and wherein the driver is rotationally fixed to the shaft.

* * * * *

UNITED STATES PATENT AND TRADEMARK OFFICE
CERTIFICATE OF CORRECTION

PATENT NO. : 7,093,902 B2
APPLICATION NO. : 10/860092
DATED : August 22, 2006
INVENTOR(S) : Ulrich Lehmann et al.

It is certified that error appears in the above-identified patent and that said Letters Patent is hereby corrected as shown below:

Title Page #56 (Foreign Patent Documents):

Delete -- EP 2 356 803 A -- and insert "GB 2 356 803 A"

Signed and Sealed this

Twenty-eighth Day of November, 2006

JON W. DUDAS
*Director of the United States Patent and Trademark Office*